United States Patent [19]

Puryear et al.

[11] 4,196,868
[45] Apr. 8, 1980

[54] LINE GUIDE FOR SPINNING REEL

[75] Inventors: John W. Puryear; Roy E. Stiner, both of Tulsa, Okla.

[73] Assignee: Brunswick Corporation, Skokie,, Ill.

[21] Appl. No.: 932,849

[22] Filed: Aug. 11, 1978

[51] Int. Cl.² .............................................. A01K 89/01
[52] U.S. Cl. ........................ 242/84.2 G; 242/84.21 R
[58] Field of Search ................. 242/84.21 R, 84.21 A, 242/84.2 R, 84.2 G, 84.5 A, 84.51 A, 84.2 A, 84.2 F

[56] References Cited

U.S. PATENT DOCUMENTS 3,670,984  6/1972  Lemery ........................ 242/84.2 G
3,788,570  1/1974  Yamazaki et al. ............ 242/84.21 R

FOREIGN PATENT DOCUMENTS 498460  1/1939  United Kingdom .............. 242/84.2 G Primary Examiner—Billy S. Taylor
Attorney, Agent, or Firm—John G. Heimovics

[57] ABSTRACT

Both conventional style and skirted style spinning fishing reels have fishing line pickup bails. The ends of the bail are pivotally mounted on rotor cup of the fishing reel. At one end of the bail, is a line guide that winds the fishing line on the spool of the fishing reel. This invention comprehends a ceramic line guide supported by a resilient bearing for use in such fishing reels.

2 Claims, 6 Drawing Figures

LINE GUIDE FOR SPINNING REEL

BACKGROUND OF THE INVENTION

1. Field of the Invention

This invention relates to conventional style and skirted style spin casting fishing reels, and more particularly, to a line guide which is both ceramic and self-lubricating.

2. Background of the Prior Art

It is well known in the prior art that all spinning style fishing reels require line guides for winding the line on to the spool during the line retrieving operation. However, line guides over which the line passes are generally made of metal, some times rotating and some times not. Because of this excessive line wear a groove can be cut into the line guide and in turn the cut line guide acts to cut and chew up further fishing lines. The second problem associated with the line guide is keeping it lubricated so that when it revolves, it revolves properly. Since the application of lubricant near the fishing line itself can cause problems for the fishing line by collecting lubricant thereon causing it to become sticky which prevents proper line casting. In either case both are undesirable. The prior art has not yet solved the problems outlined above.

SUMMARY OF THE INVENTION

This invention relates to conventional style and skirted style spinning fishing reels and, more particularly, to a ceramic line guide that is utilized for winding the fishing line on the spool.

It is therefore an object of this invention to provide a ceramic line guide for winding fishing line onto conventional style and skirted style spinning reels.

Another object of the invention is the provision for such a line guide whereby it is supported by a resilient self-lubricating plastic roller which is able to take shock loads which may be created by the line on the ceramic roller and also act as a self-lubricating bearing.

Another object of this invention is the provision for such a line guide which is placed on a pivoting axle which is directly connected to the bail arm of the fishing reel.

The above and other further objects of the features will be more readily understood by reference to the following detailed description and accompanying drawings.

DESCRIPTION OF THE PREFERRED EMBODIMENTS

Figure 1:
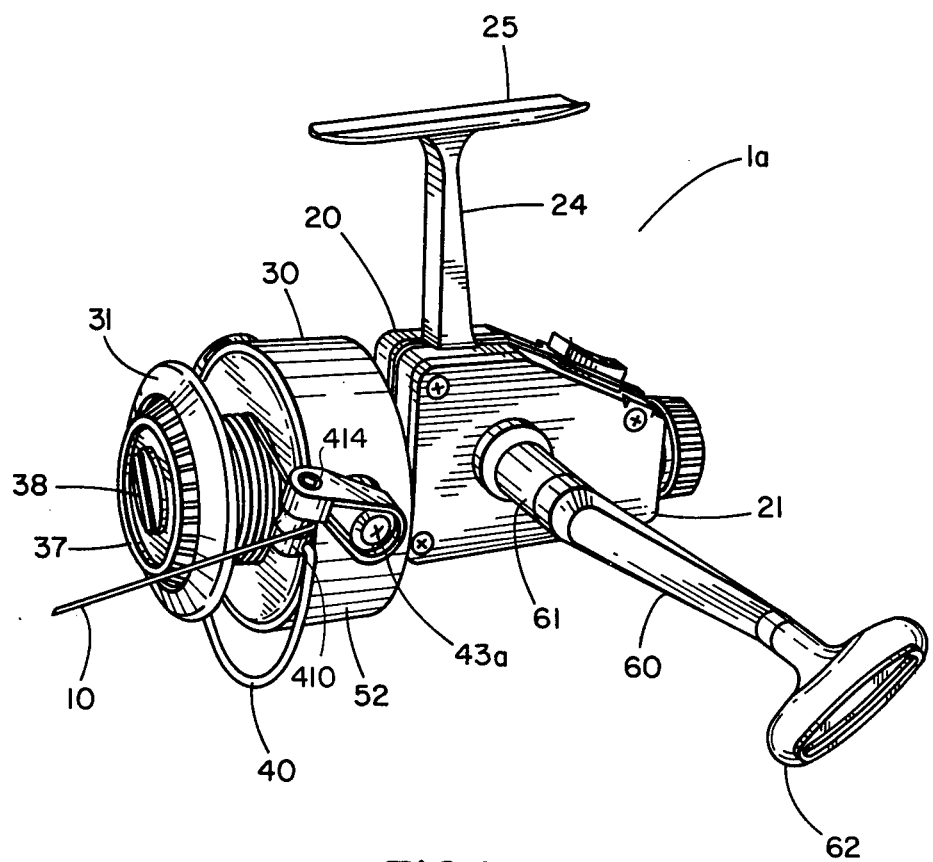
FIG. 1 is a perspective view of the conventional style spinning reel containing the invention described herein.
Figure 2:
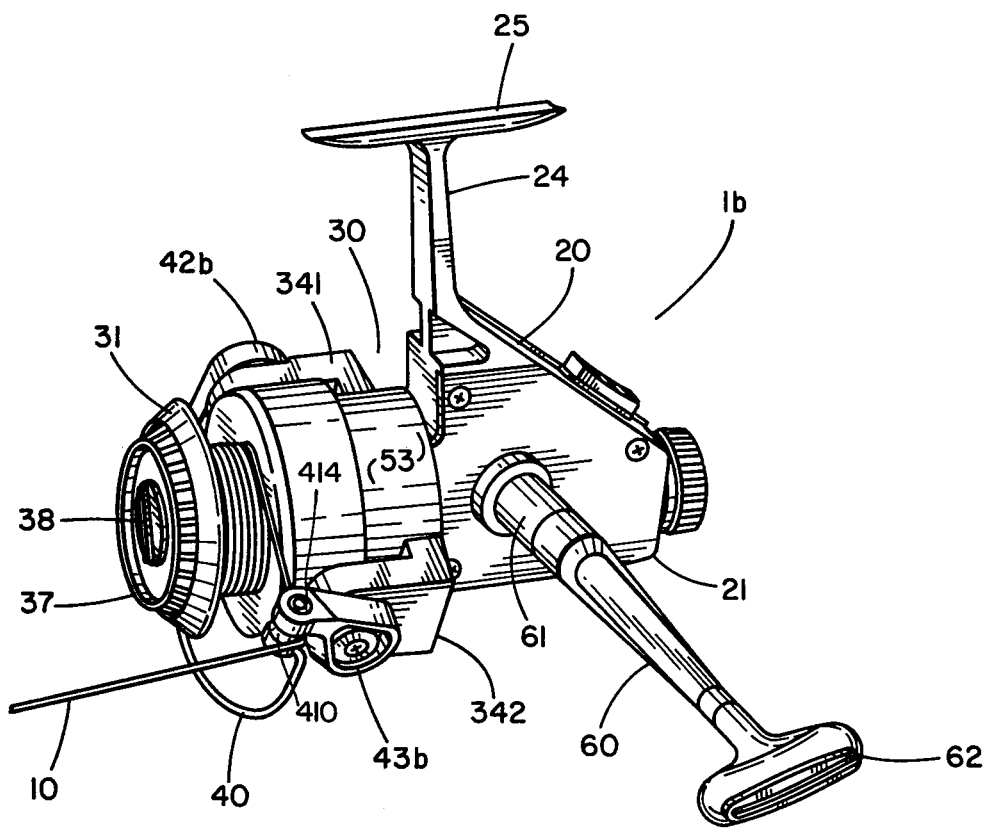
FIG. 2 is a perspective view of the skirted style spinning reel containing the invention described herein.

In FIG. 1, a conventional style open-face fishing reel 1a is shown and in FIG. 2 a skirted style open-face fishing reel 1b is shown. Both styles of reels function similarly, the only exception being the arrangement of the spool. As used hereinafter, the same numerals will designate the common parts for both reels; for special parts on the reels different numerical designations will be used. The reel 1a or 1b having a housing 20 which includes an integral gear case 23, a stem 24 which connects the housing to a shoe 25. The shoe 25 is used to attach the reel to spinning style fishing rods. The reel includes a crank assembly 60, rotatable about a crank shaft hub 61 with a rotatable winding handle 62 for use by a fisherman with his left hand for line retrieval while the rod (not shown) is being held by the right hand as shown in FIGS. 1 and 2 only. As will be described hereinafter, the handle 62 may be disposed on the other side of the gear case 23 for accommodating the personal desires of the user.

An axially mounted rotor housing 30 is provided and adapted to rotate about the axis of the spool 31 as the crank 60 is turned for line retrieval, with the line 10 being captured by the bail 40 passing over the line guide assembly 14 as shown. Bail 40 and line guide 41 rotate with rotor 30 and the line 10 is thereby wound on the spool 31. The shank of the screws 32 and 33 function as rotary pivot bearing points and are accordingly the centers of rotation for the bail 40 via the bail arms 42a, 42b, 43a and 43b. An internal mechanism causes the line spool 31 to reciprocate axially back and forth as the rotor 30 winds the line 10 about the spool 31; but as in spinning reels generally, the spool 31 does not rotate about its central core axis, except as controllably permitted by the adjustable free-floating drag mechanism 50. Such permitted rotation of the spool may occur during the line retrieval when a fish is on the other end of the line 10 fighting for its life while still in the water; and, thus the force of the drag friction is overcome by tension in the line. When the bail 40 is swung open from the line 10 to an open position for casting, the line 10 may freely pay out from the spool 31 over lip 99. In FIGS. 1, 2, 5 and 6, the bail 40 is shown in the "closed", "retrieve", or "rewind" position. The line guide roller 410 is preferably rotatable, that is, it is preferably a miniature pulley to reduce the sliding friction which might otherwise cause line wear.

In paying out the line 10 over the lip 99 of the forward flange of the line spool 31 during casting, the fisherman using an open face spinning reel is obligated to use his finger to snub the line and arrest its pay out, since the normal line drag provisions are not operative unless the reel is in the rewind or line retrieval mode of operation.

In the overall arrangement of the reel a cover plate 21 is secured to the gear case 23 by screws 26. Inside the gear case 23 is a gear assembly 70 that is rotatable by rotating the handle 62 about the hub 61. Oscillator gear 73 is rotatably mounted on stub shaft 27 which may be part of the interior of the housing gear case 23 or secured separately thereto. Gear 73 has an inwardly projecting plug 74 that fits into groove 76 (shown in phantom in FIGS. 5 and 6) of oscillator slider 75. Rotation of the gear 73 causes the slider 75 to slide forward and backward. Crank shaft gear assembly 64 has a tubular center shaft 65 that is journal mounted in bearings 66 in gear case 23 (partly shown) and in cover plate 21. The shaft 65 has an internal right hand thread that mates with the right hand thread 67c of shaft 67 on one side and a left hand thread that mates with left hand thread 67d when the shaft is placed on the other side of the reel. This dual threaded system enables the reel to be cranked both from the right hand and the left hand. The open end of the shaft 65 (the end which the shaft 67 is not inserted) is closed off by inserting screw cap 6 exterior of the gear case 23.

Small gear 68 meshes with gear 73 as the handle 62 rotates the shaft 67 thus providing the back and forth sliding motion to slider 75. A pinion gear assembly 80 is forwardly rotatably journal mounted in bearing 2 that is mounted in the forward section 22 of the housing 20 and secured there by bearing retainer 3 which fits into groove 4. The assembly 80 has a forward shaft 81 with oppositely spaced flats 82 thereon, a central bore 83, a forward threaded portion 84, a rearwardly projecting bearing stud 85 and a gear 86. The bearing stud 85 fits into bearing mount 28 which is part of housing 20. Thus, the pinion assembly 80 has two-point bearing support. The larger gear 69 engages pinion gear 86 causing it to rotate.

The center shaft 11 has back square portion 12, undercut grooves 13, front pin 14 which press fit into the shaft 11 and a front threaded portion 15, the shaft 11 slip fits into the pinion bore 83 and is supported thereby. The shaft 11 also fits through the hole 77 in slider 75. Special clip 16 fits around the hole 77 and slides into grooves 13 locking the shaft 11 to the slider 75. Thus, when the slider 75 oscillates back and forth the shaft 11 also moves back and forth with respect to the forward section 22 of the housing 20.

The rotor 30 is mounted on the forward portion 81 of assembly 80. The hole 34 with flats 34c is sufficiently large to pass over the pin 14 and then tighten on the forward threaded portion 84 by the use of tang 35 and nut 36; the respective flats 82 and 34c operable with each other. THe spool 31 fits over the shaft 11 with the spool retainer knob 37 that is retained near the lip 99 having an internal threaded portion 39 that tightens down on thread 15. Thus, as the handle 62 turns the crank shaft 67, the gear assembly 64 causes the pinion assembly 80 to rotate which in turn causes the rotor 30 to rotate. At the same time rotation of gear 73 causes the slider 75 to reciprocate back and forth which causes the shaft 11 to move back and forth, so that line 10 can be wound during the retrieve mode in an orderly and uniform fashion on spool 31.

Contrary to standard spinning reels that have their drag associated with the front spool or locked into the back portion of the housing, the drag mechanism 50 is free-floating (it is self-contained as a unit and not captured in the housing).

Figure 3:
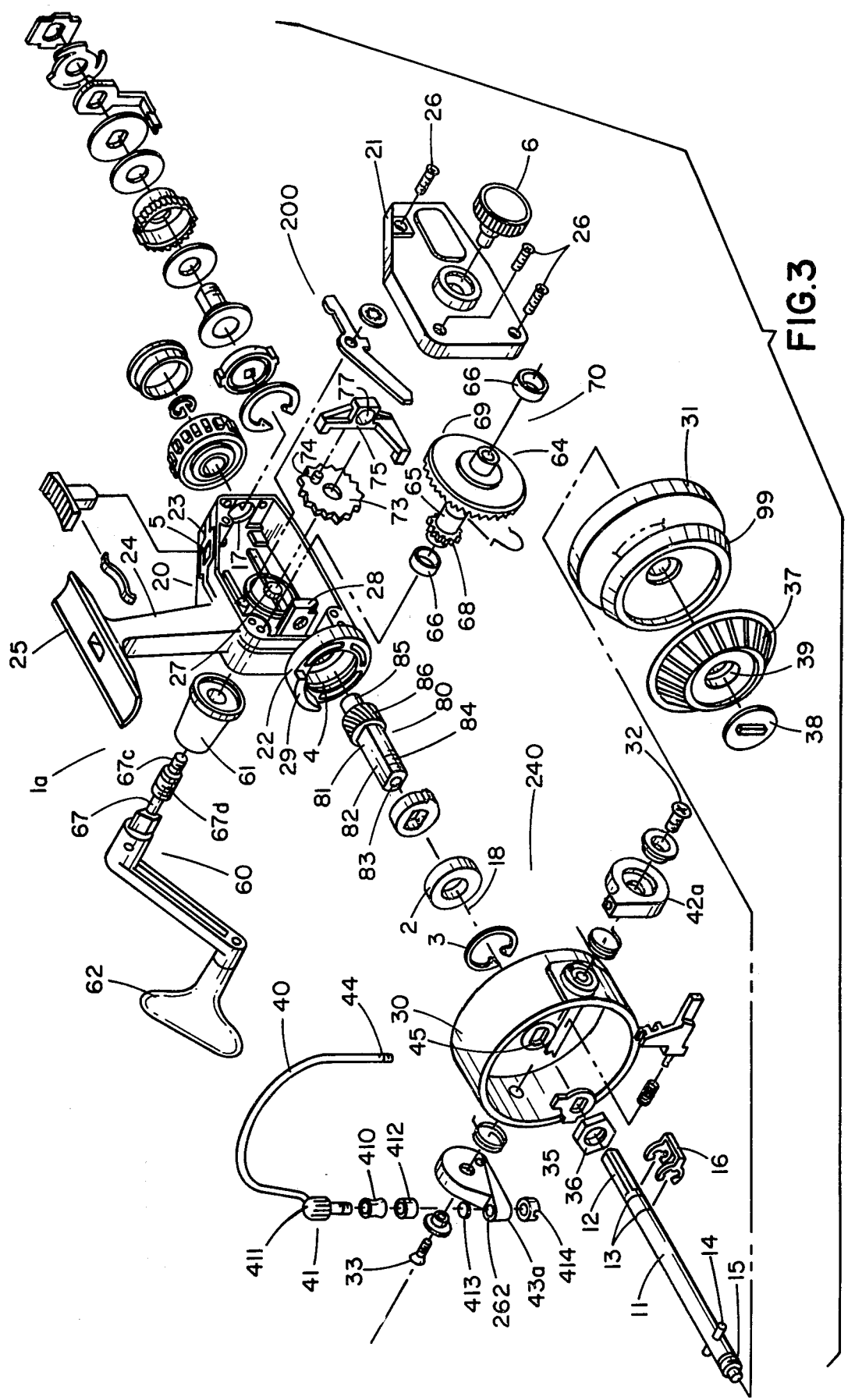
FIG. 3 is an exploded perspective view of the conventional style spinning reel containing the invention described herein.
Figure 4:
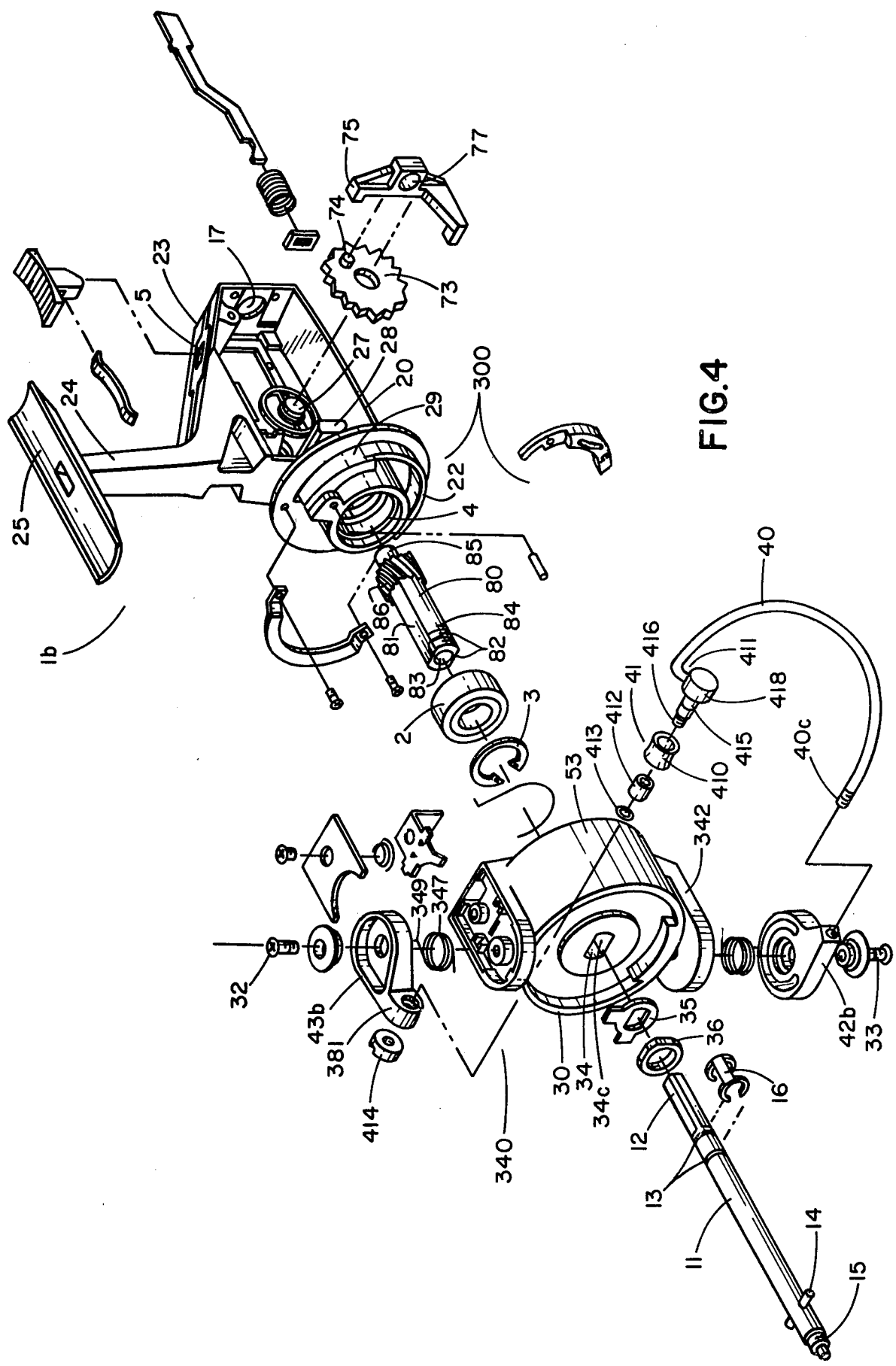
FIG. 4 is an exploded perspective view of the skirted style spinning reel not depicting some of the parts in common with the conventional reel shown in FIG. 3 but capable of incorporating the invention described herein.
Figure 5:
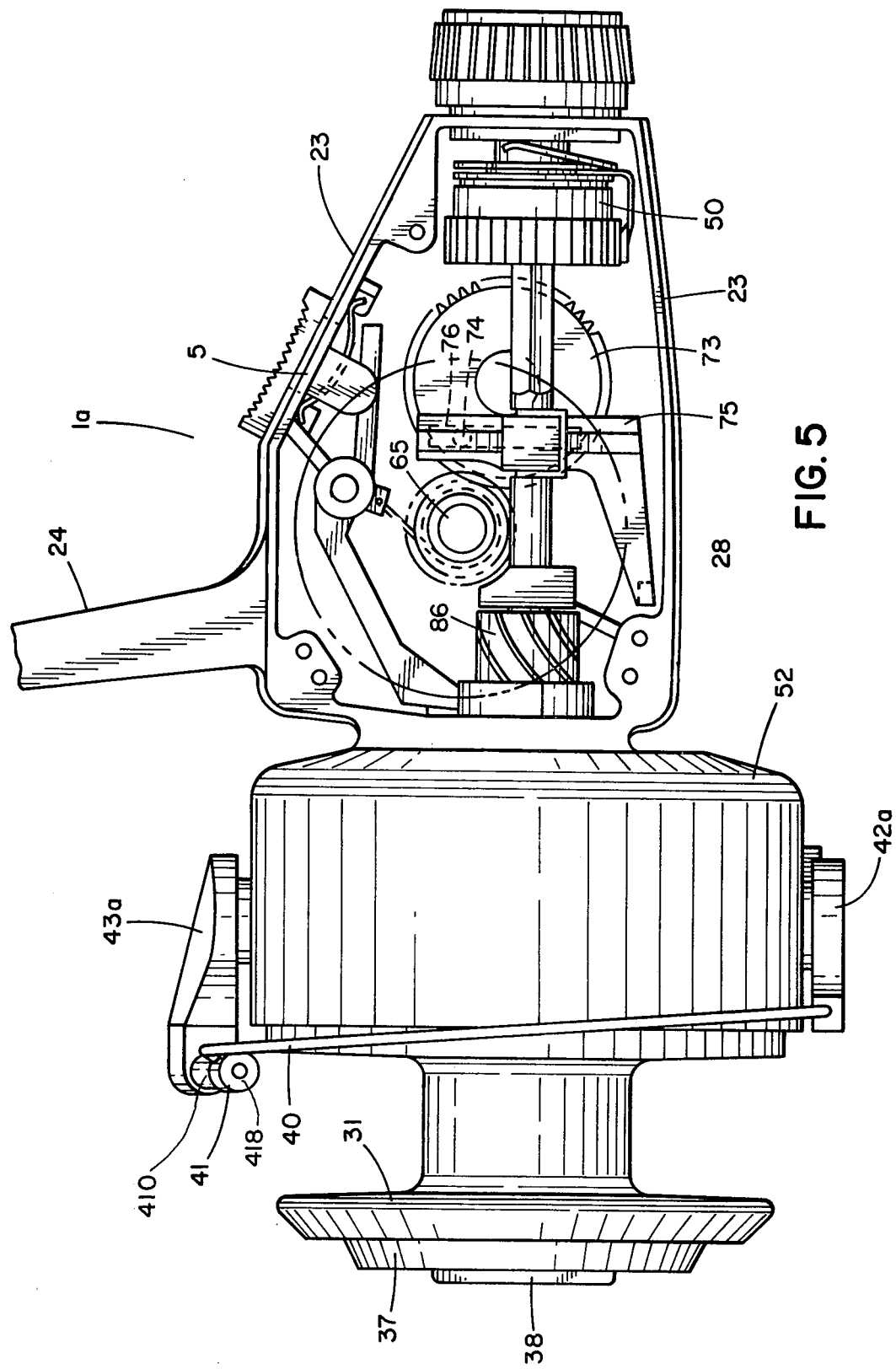
FIG. 5 is a cutaway side view of the conventional style spinning reel depicting the relative location of some of the parts of the reel.
Figure 6:
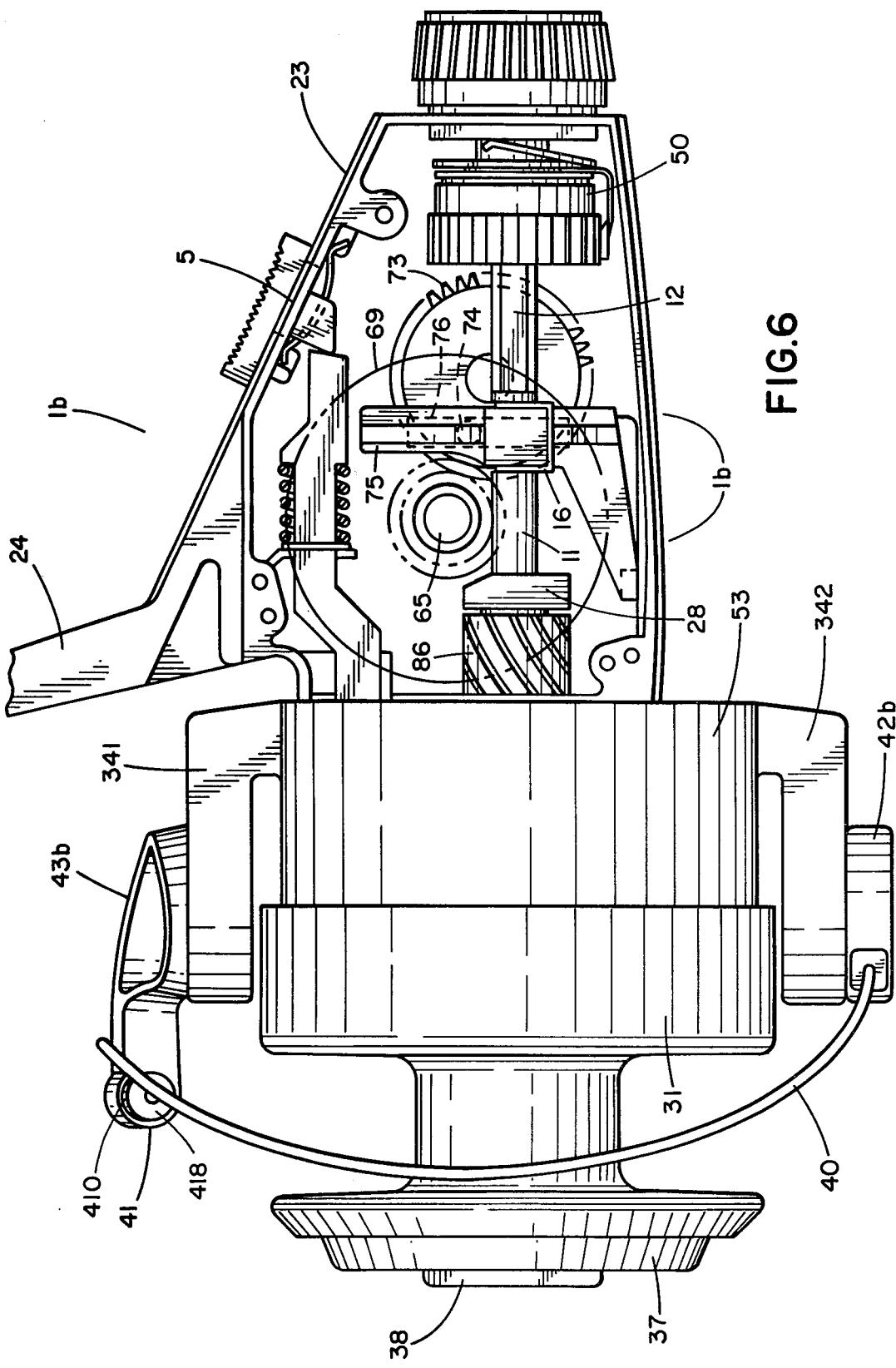
FIG. 6 is a cutaway side view of the skirted style spinning reel depicting the relative location of some of the parts of the reel.

A unique feature of reels 1a and 1b is the combined anti-reverse and self-centering bail feature that optionally can be used. In all spinning reels there is one best position in which to open the bail for casting, this is normally when the bail arms 42a, 42b, 43i a and 43b are in generally vertical alignment with stem 24. Concomitantly, all reels need a device that prevents the rotor from rotating backward or in the counterclockwise direction when the reel is viewed from the face or the spool 31. In the conventional reel 1a shown in FIGS. 1, 3 and 5, self-centering mechanism 200 is depicted and in the skirted reel 1b as shown in FIGS. 2, 4 and 6, the self-centering mechanism 300 is depicted.

Not only is the anti-reverse and self-centering of the bail necessary, an automatic mechanism that causes the bail to move from the casting position to the retrieve position by just a turn of the handle 62 is also required. In the conventional reel 1a, shown in FIG. 3, the automatic internal bail trip mechanism 240 is shown in an exploded view. Most of the mechanism is contained in the rotor cup 52 and cooperates with cam 29 on the face 22 of the housing 20. In the skirted reel 1b, shown in FIG. 4, the major portion of the unique (unique because most skirted reels have external bail trip mechanisms) internal bail trip mechanism 340 is contained in ear 341 on the rotor 30 and cooperates with the cam surface 29 on the front of the housing 20.

In a preferred embodiment of the invention, a pivoting axle 418 is secured to the end 411 of the bail 40 such as by staking. The axle 418 includes an elongated shaft 415 with a threaded end 416. A resilience cylindrical bearing 412 is mounted on the unthreaded portion of shaft 415. The ceramic line guide roller 410 is snugly slip fit over bearing 412. The roller 410 can be made of materials such as aluminum oxide or other ceramic materials. A washer 413 is placed adjacent to the bearing on the shaft 415 and the threaded end 416 is placed in hole 262 of bail arm 43a (43b). Nut 414 is tightened down on thread 416 thus securing the line roller assembly 41 to the bail arm. THe washer 413 mates with a small rim on a shaft 415 so that the ceramic roller 410 is free to rotate as the fishing line is wound on the spool by means of the assembly 41. Since roller 410 is of a brittle ceramic material, the bearing 412 is made of a resilient material such as plastic so that it will absorb sudden shocks. Since the bearing 412 and roller 410 need lubrication, the plastic material used to make the bearing has incorporated a lubricant such as graphite, TFE, silicone, molyddenum disulfide, and the like, so that an extra lubricant is not needed and will therefore not foul up the fishing line.

Although specific embodiments of the invention have been described, many modifications and changes may be made in the fishing reel without departing from the spirit and scope of the invention as described in the appended claims.

What is claimed is:

1. In an open face spinning reel used for casting bait attached to a fishing line and for retrieving the bait and fishing line after casting, the reel having a housing, a center shaft mounted in the housing, a spool mounted on the shaft for holding the fishing line, a handle and gear train assembly mounted in the housing, a rotor coaxially mounted on the shaft and rotatable by cooperative movement of the handle and assembly, and a movable bail mounted on the rotor having an open casting position and a closed retrieving position, the improvement being a line pick up used during retrieving the line, comprising:

(a) a U-shaped bail with two ends,
   (b) a movable axle mounted on one of the bail ends,
   (c) a resilient cylindrical bearing notably mounted on the axle and having a slip fit therewith,
   (d) a line roller snuggly mounted on the bearing, the roller having a partially concave outer surface.

2. The reel of claim 1 wherein the roller is ceramic and cushioned by the resilient bearing.

* * * * *